UNITED STATES PATENT OFFICE.

EMIL BERINGER, OF CHARLOTTENBURG, GERMANY.

METHOD OF MAKING HYDROCYANIC ACID.

SPECIFICATION forming part of Letters Patent No. 652,741, dated July 3, 1900.

Application filed October 4, 1899. Serial No. 732,544. (No specimens.)

*To all whom it may concern:*

Be it known that I, EMIL BERINGER, a subject of the King of Prussia, Emperor of Germany, residing at Charlottenburg, in the Kingdom of Prussia, Germany, have invented certain new and useful Improvements in the Processes of Producing Hydrocyanic Acid from Sulfocyanides, of which the following is a specification.

The known oxidizing action of nitric acid on sulphocyanide, producing hydrogen cyanide, may be expressed by the equation:

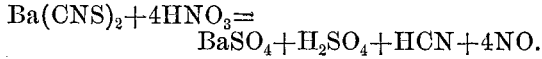

$$Ba(CNS)_2 + 4HNO_3 = BaSO_4 + H_2SO_4 + HCN + 4NO.$$

Various attempts have been made to render this reaction practically useful; but all the processes devised suffer from the objection that in the course of the reaction much of the hydrogen cyanide is oxidized to carbon dioxide, so that the yield of hydrogen cyanide is too small for profitable application of the process.

I have found that the production of carbon dioxide in the process is due to the action of free mineral acid, which in the case of the reaction expressed by the above equation is sulphuric acid formed by the chemical change. If, therefore, this production of carbon dioxide is to be suppressed the reaction must be carried out in such manner that no free acid is formed or can become active, and it is to such manner of carrying out the process that my invention relates.

For the purpose of avoiding the formation of free sulphuric acid I substitute for the nitric acid requisite for the oxidation an equivalent quantity of a nitrate—such as barium nitrate, calcium nitrate, or the like. If now an acid capable of liberating nitric acid be allowed to act upon this nitrate, the nitric acid thus set free will oxidize some of the sulphocyanide, producing free sulphuric acid. The latter, however, will react with the nitrate present to form a sulphate and to liberate more nitric acid, which in its turn oxidizes sulphocyanide. In this manner the sulphocyanide may be oxidized without formation of free acid, as is expressed by the following equation, in which the barium salts are used as typical of suitable salts:

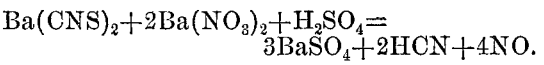

$$Ba(CNS)_2 + 2Ba(NO_3)_2 + H_2SO_4 = 3BaSO_4 + 2HCN + 4NO.$$

The production of carbon dioxide is reduced to a minimum when the oxidation of a sulphocyanide is effected in this manner, and as a consequence the yield of hydrogen cyanide is nearly that indicated by theory.

The following example serves to illustrate the process: Eighty-two kilos of barium nitrate are dissolved in seven hundred liters of water contained in a retort provided with a stirrer. Into the boiling hot solution are poured either separately, in small portions, or mixed together and gradually a solution of 37.2 kilos of barium sulphocyanide in one hundred liters of water and a solution of 31.6 kilos of sulphuric acid of specific gravity 1.84 in one hundred liters of water. If barium sulphocyanide or calcium sulphocyanide is used, it is advantageous to mix the solution of this salt with that of the sulphuric acid and to allow the barium sulphate or calcium sulphate to settle before pouring the liquid into the barium-nitrate solution. The hydrogen cyanide liberated by the reaction distils over with the steam and is worked up in the usual manner.

I claim—

The herein-described process of producing hydrocyanic acid consisting in slowly adding to a boiling aqueous nitrate solution, a solution of sulphocyanide together with a mineral acid in quantity corresponding to one-half the nitrate employed, substantially as described.

In witness whereof I have hereunto signed my name in the presence of two subscribing witnesses.

EMIL BERINGER.

Witnesses:
WOLDEMAR HAUPT,
HENRY HASPER.